Dec. 28, 1948. G. H. NORQUIST 2,457,262
SHIPPING ASSEMBLY
Filed Oct. 17, 1944 3 Sheets-Sheet 2
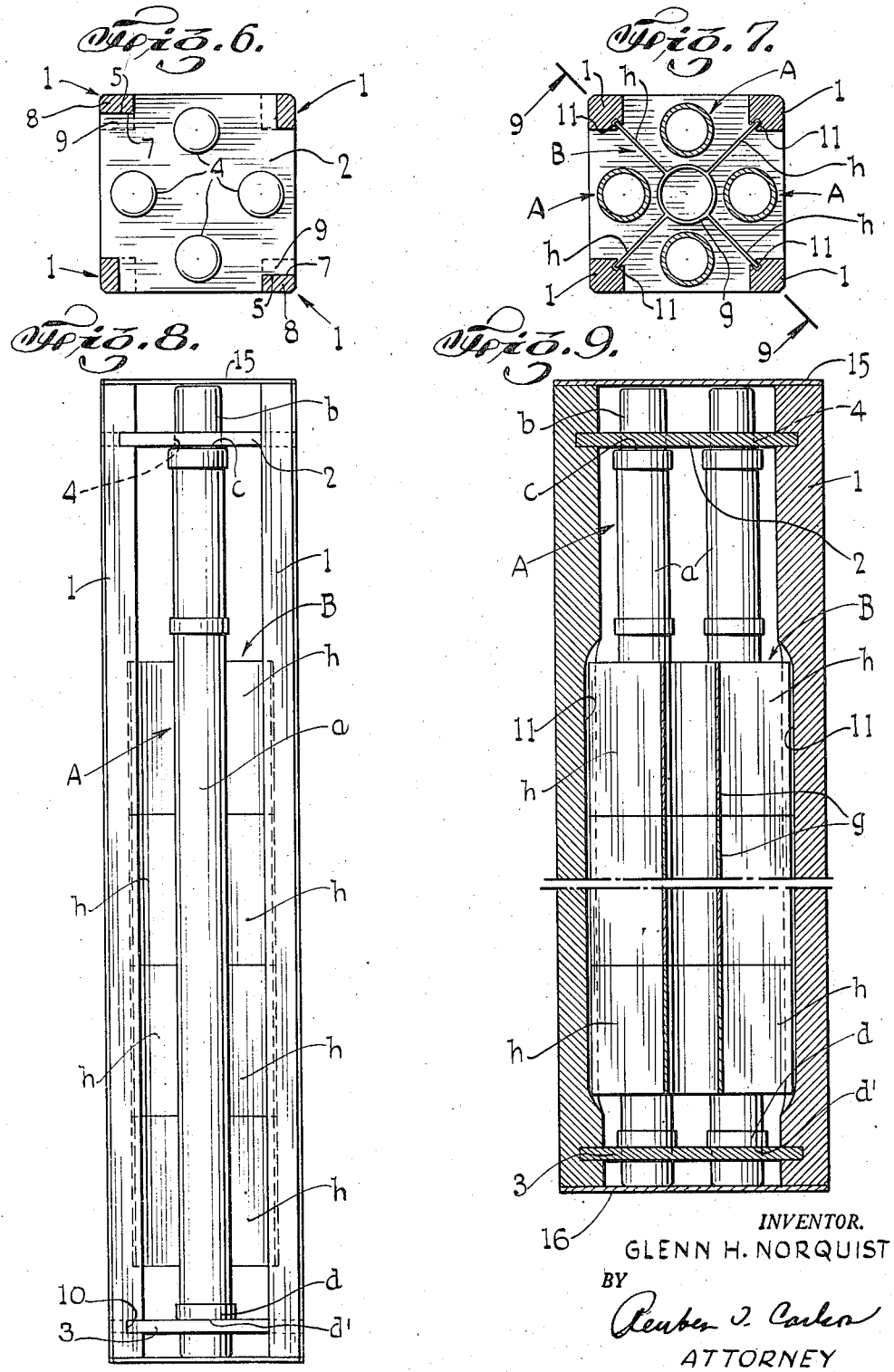
INVENTOR.
GLENN H. NORQUIST
BY
Reuben J. Carlson
ATTORNEY

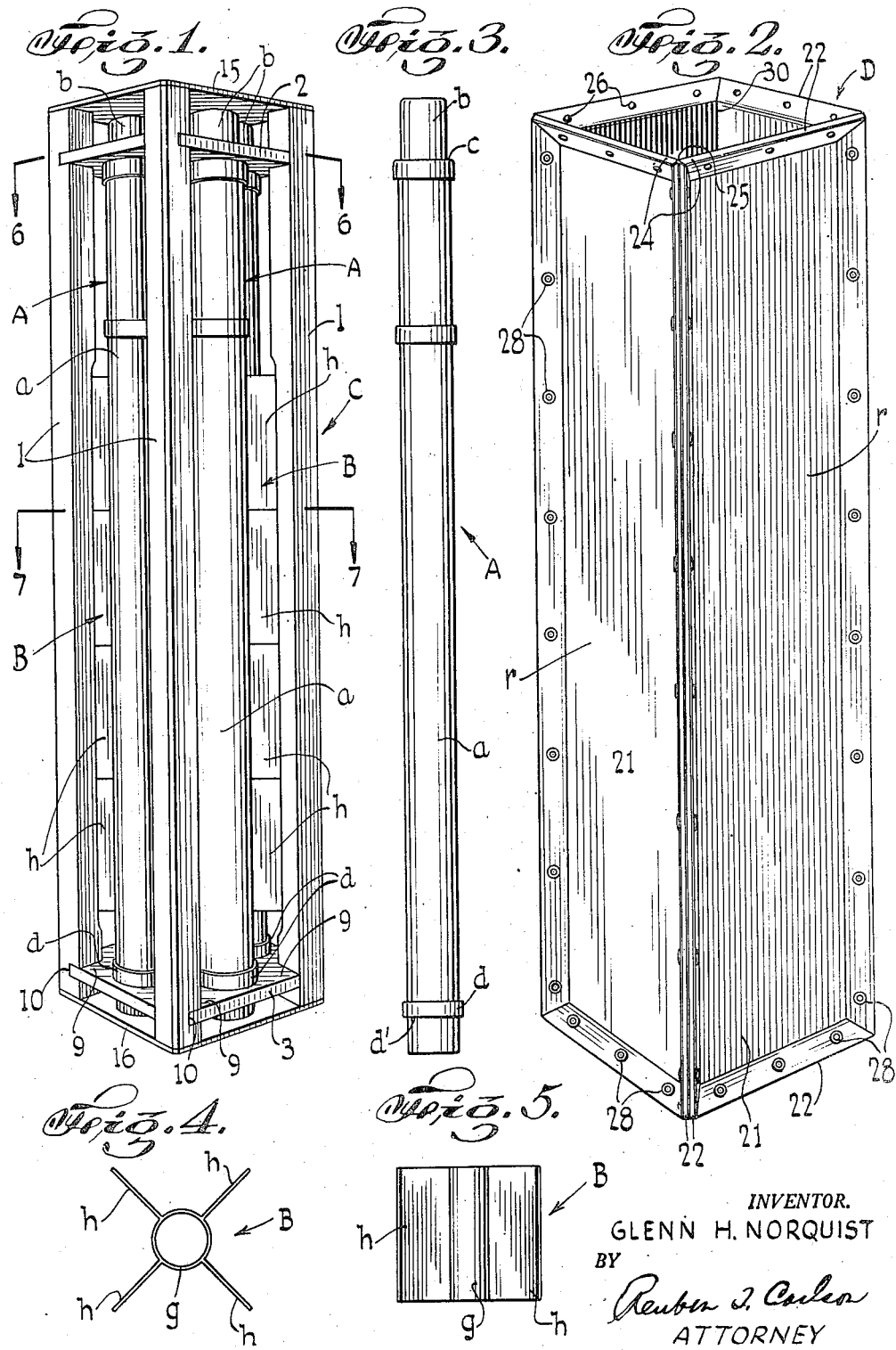

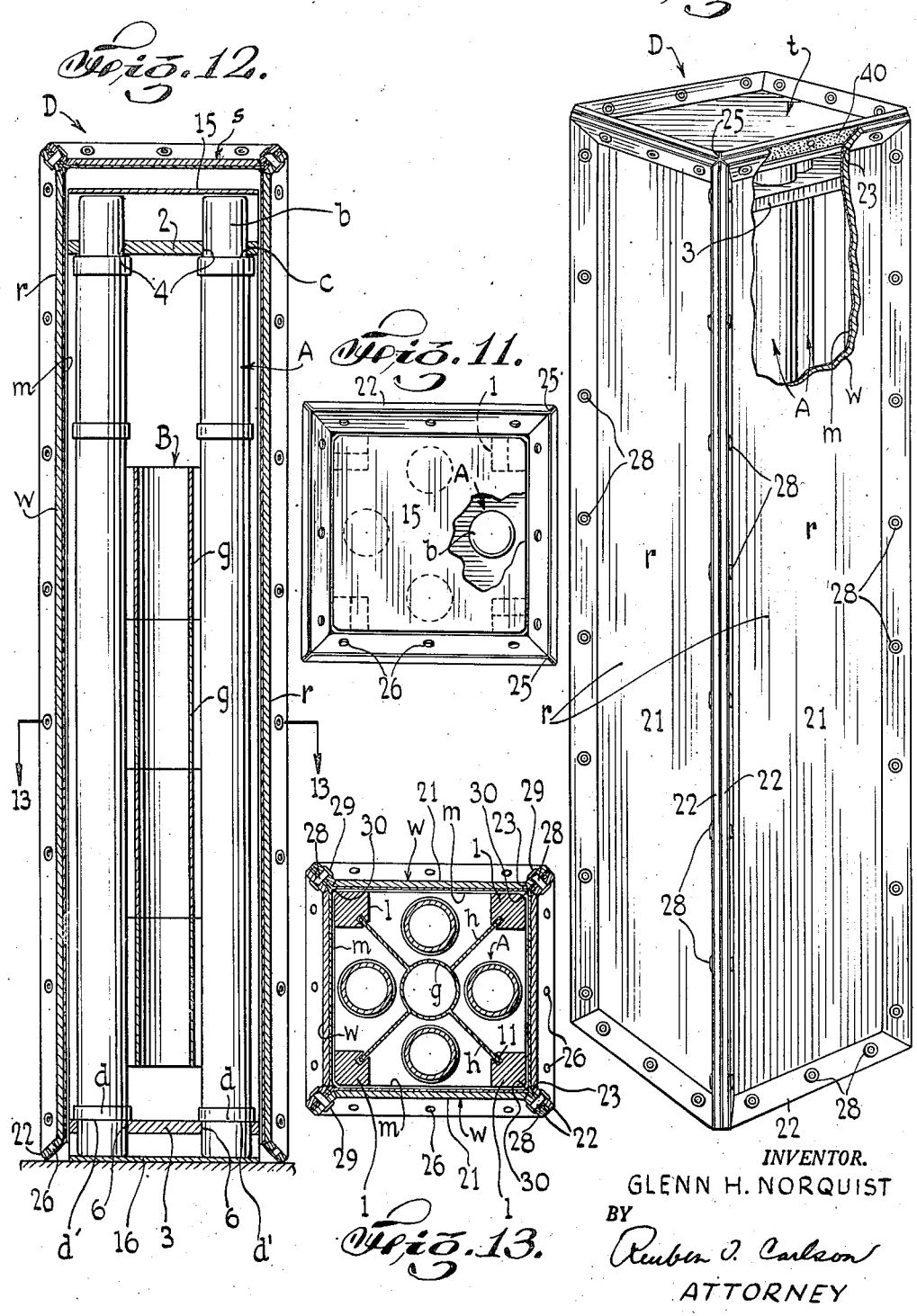

Patented Dec. 28, 1948

2,457,262

UNITED STATES PATENT OFFICE 2,457,262

SHIPPING ASSEMBLY

Glenn H. Norquist, Jamestown, N. Y.

Application October 17, 1944, Serial No. 558,980

3 Claims. (Cl. 206—65)

1

This invention relates to shipping assemblies, and more particularly to the combination of an enclosed shipping case having associated therewith a framework structure for supporting the elongated articles within the case in a manner to protect the articles from damage during shipment and handling.

The shipping assembly forming the subject matter of this invention finds particular application to the packing and shipping of delicate elongated articles, such as rocket motors and their associated tail fins. Such rocket motors are contained within a steel tubing several inches in diameter and several feet long, which house and contain the delicate rocket motor mechanisms. A tail fin comprising a tubular section having four guide blades or fins radiating therefrom is provided for attachment in the field in the casing of the rocket motor. Such rocket motor assemblies weigh 50 pounds or more, must be protected from blows which may damage the delicate mechanism therein, and which furthermore must be shipped in air-tight containers so that moisture will not rust or damage any parts thereof. Due to these exacting shipping requirements and the shape and weight of the rocket motors and tail fins, unusual problems of a difficult nature with respect to the adequate packing and shipping of the same to satisfactorily meet all special requirements is presented.

In accordance with this invention, four such rocket motors and the associated four tail fins are supported by an inner protective framework and are housed within a specially constructed metal lined shipping case dimensioned to snugly receive the framework unit. The framework is assembled from four wood uprights of generally square cross-section, and somewhat longer than the rocket motor casings. A sturdy partition member is provided at each end of the framework for supporting the ends of four rocket motor casings. Each of said partition members is provided with four spaced holes or openings therein each shaped to snugly receive the adjacent end of a rocket motor casing. The partition members are retained in fixed spaced relationship by frame members or uprights. The corners of the partition members seat into preformed notches in the adjacent corner uprights. The tail fins are placed within the framework with the ends of each of the four fin blades fitting within an elongated slot cut in the inner corner of each of the uprights, with the tubular sections of the tail fins positioned centrally of the four uprights. As thus arranged each fin blade

2 will extend between an adjacent pair of rocket motor casings, but the rocket motor casings will be maintained in spaced relationship from each other as well as from the tail fins. An end panel may be positioned at each end of the framework to further protect the ends of the motor casings from damage. The four uprights need not be secured to the supporting partitions since these parts will be locked in position when the enclosing case is telescoped thereover. When the framework and articles supported thereby have been positioned in the shipping case, the final panel of the shipping case is secured in position and the fully packed container is ready for shipment.

The improved supporting framework made in accordance with this invention may be assembled from relatively few wood parts with a minimum of operations and at low cost. The elongated articles and parts thereof, such as rocket motors and tail fin parts, are locked within and to the framework and securely retained in fixed position. The wood uprights and supporting partitions are locked together by notches so that the framework can be quickly pulled apart when removed from the shipping case to provide almost immediate access to the articles packed therein. The packing case is shaped to closely and snugly receive the supporting framework so that the uprights and supporting partitions are held firmly locked together when in the shipping case. The shipping case is preferably constructed as shown and disclosed in my copending application Serial No. 557,023, which provides an extremely strong air-tight protective enclosure for the articles supported by the framework.

Other objects and advantages of this invention will become additionally apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which:

Fig. 1 is a perspective view of the fully assembled inner supporting framework having four rocket motor casings and four complementary tail fins assembled within the framework;

Fig. 2 is a perspective view of the metal lined packing case constructed to receive the assembled unit as shown in Fig. 1;

Fig. 3 is an elevational view of one of the rocket motors to be packaged;

Fig. 4 is a top view of one of the tail fins to be packaged;

Fig. 5 is a side elevational view of the tail fin;

Fig. 6 is a transverse cross-sectional view through the supporting frame work as the same appears when viewed along line 6—6 of Fig. 1;

Fig. 7 is a transverse cross-sectional view through the supporting framework as the same appears when viewed along line 7—7 of Fig. 1, the rocket motor casings and tail fins being shown in cross-section as arranged therein;

Fig. 8 is an elevational view of the supporting framework, with the rocket casings and tail fins assembled therein;

Fig. 9 is a longitudinal cross-sectional view to the supporting framework as the same would appear when viewed along line 9—9 of Fig. 7, the rocket casings and tail fins being shown assembled therein;

Fig. 10 is a perspective view of the closed and sealed packing case having the supporting framework, rocket motors and tail fins assembled therein, certain parts being broken away to expose a section of the interior;

Fig. 11 is an elevational view of the packing case showing the supporting framework and rocket motor casings arranged therein in dotted lines;

Fig. 12 is a longitudinal cross-sectional view taken through the supporting framework and container case showing the manner in which the case is telescoped over the frame work unit during the process of packaging; and Fig. 13 is a transverse cross-sectional view through the supporting framework and enclosing case as the same would appear as viewed along line 13—13 of Fig. 12.

Similar reference characters refer to similar parts throughout the several views of the drawings and specification.

In order that the subject matter of this invention may be more readily understood, the general shape of the rocket motor casings and tail fins to be packaged will first be described. As shown more particularly in Fig. 3, each rocket motor A comprises a tubular metal casing a usually made from four to eight feet in length and from three to eight inches in diameter. One end b of the casing is reduced in diameter presenting a shoulder c. A collar formation d is secured to the other end of the casing a which also presents a supporting shoulder d'.

The tail fin B is separately assembled for later attachment to the casing a of the rocket motor A. The tail fin B is attached to the rocket motor A in the field or location of use. As shown in Figs. 4 and 5, the fin assembly B comprises a tubular collar g shaped to telescope over the casing a of the rocket motor A. Four metal blades h are secured to and radiate from the collar section g. The blades h are substantially equally spaced and extend substantially radiately in a plane which substantially bisects the longitudinal axis of the tubular section g.

As shown more particularly in Figs. 1, 6, 7 and 8, the supporting framework C is designed to support and contain four rocket motors A and a complement of four tail fins B. The supporting framework is assembled from four wood uprights 1, which may have a substantially square cross-section and a length which is somewhat greater than the length of the rocket motors A, so that the ends of the uprights will extend slightly beyond the ends of the rocket motors. A supporting partition 2, which may be advantageously formed of laminated plywood, supports the upper ends of the rocket motors A in fixed spaced relationship, and a supporting partition 3 formed of plywood supports the bottom ends of the rocket motors in fixed spaced relationship. The supporting partition 2 has four spaced holes 4 cut therein each designed to receive the reduced end b of the rocket motor when the partition 2 rests upon the shoulder portion c thereof. Each hole 4 is proportioned to snugly receive the reduced end b of the rocket motor A and the four holes are equi-distantly spaced apart and substantially equally spaced from the longitudinal center line of the framework C. It will be noted that the supporting partition 2 is approximately rectangular in contour, and has a rectangular notch 5 cut out from each corner thereof.

The partition 3 which supports the lower ends of the rocket motors is similar in shape and form to the supporting partition 2 above described, except that the holes 6 through which the lower ends of the rocket motor casings a telescope are somewhat larger than the holes 4 in the supporting partition 2, the holes 6 being of sufficient size to snugly receive and accommodate the lower ends of the rocket motor casings a. The lower supporting partion 3 is designed to rest on the shoulders d' formed by the collars d. The supporting partition 3 is likewise substantially rectangular in outline and has a rectangular notch 5 cut out from each corner thereof.

The upper end of each upright 1 has a groove 7 cut therein which extends transversely across one of the inner side faces thereof. Each groove 7 is shaped to snugly receive a corner section of the supporting partition 2, the notch 5 at the corner of the partition 2 embracing the uncut stock 8 of the upright. As shown in Fig. 1, the uprights 1 are of equal length and the grooves 7 cut therein are spaced from the upper ends thereof and located so that the corner sections 9 of the partition 2 will snugly seat therein when the partition 2 rests upon the shoulders c of the spaced rocket motor casings a.

The lower supporting partition 3 has the corner sections 9 thereof snugly fitted into similar grooves 10 transversely cut into each upright 1 across one of the inside faces thereof. Each of the grooves 10 are so positioned that when the lower supporting partition 3 rests upon the collars d of the rocket motor casings a, the corner sections 9 of the partition 3 will snugly fit into the adjacent grooves 10 cut in the uprights 1. It will be noted that the partitions 2 and 3 are not secured to the uprights 1 either by nails, screws, glue, or other extraneous means, but these parts are held in assembled relationship solely by the close frictional fit between the corner sections 9 of the partitions and the notches in the uprights.

As shown more particularly in Figs. 7, 8 and 9, each of the four tail fins B are arranged centrally of the uprights 1 in vertically stacked relationship. As thus assembled the tubular section g of each tail fin is located equi-distantly between the uprights 1 with each blade h thereof radiating outwardly in a direction towards the longitudinal center line of each upright. Each upright 1 has a longitudinally extending slot 11 cut in the inner corner thereof shaped and designed to snugly receive the outer end portion of the adjacent blade h. Thus it will be noted that the vertical ends of the four blades $h$ of each vertically stacked tail fin are locked in position by the frame members 1 and firmly held within the supporting framework C. As shown in Fig. 7, each rocket motor casing $a$ is disposed between an adjacent pair of blades $h$, but maintained out of contact with the blades $h$ and the tubular collar $g$ of the tail fins by the supporting partitions 2 and 3. The entire supporting framework as thus assembled is, however, held together prior to insertion into the packing case by the frictional fit between the corner sections 9 of the supporting partitions 2 and 3 and the snugly formed grooves 7 and 10 in the uprights 1.

The assembled unit, comprising the supporting framework B with the four rocket motors A and the four tail fins B assembled therein as above described, is contained within a packing case D as shown more particularly in Fig. 2, designed and proportioned to snugly receive the same.

The packing case D is assembled from four side wall forming panels and a bottom wall panel properly shaped and dimensioned so that when properly assembled together the case will snugly receive the supporting framework B, as shown in Figs. 10, 11, 12, and 13. Each of these panels comprise a base sheet $w$ having a metal sheet $m$ permanently and firmly cemented to one side thereof. The base sheet $w$ is preferably formed of a plurality of superimposed thin layers of wood or veneer which are firmly bound together by a suitable plastic cement.

The metal clad panels are so arranged that the metal sheets $m$ form the liner wall of the packing case, and the base sheets $w$ form the exterior wall surfaces thereof. In constructing each of the metal clad panels, a flat base sheet and a flat metal sheet are first bonded together and the flanges are then formed by cutting grooves 23 in the base sheet so that the side flanged sections 22 may be shaped to extend at approximately a 45° angle to the main or facing section 21 thereof. The corners of the base sheet are also notched out, but the metal sheet is uncut and unweakened at the corners, leaving an exposed metal corner section which is crimped and folded to provide an inturned double ply reinforcing rib 25, as shown in Fig. 10, which is wedged between the ends 24 of the flanged sections 22 of the base sheet. An unusually strong and sturdy corner construction is thus formed. Prior to flanging, spaced holes 26 may be punched in the flanged sections 22 thereof through which rivets or eyelets 28 may be inserted when the flanged panels are assembled into a packing case.

In assembling the packing case, a tubular body is first assembled from four flanged side wall forming panels $r$. The holes 26 punched in the flanges 22 thereof are brought into alignment and hollow rivets or eyelets 28 are then driven through these aligned holes and the ends thereof headed over as at 29 to firmly clamp and hold the paired flanges of the adjacent side wall panels together in rigid assembly. The bottom wall panels are then preferably applied and secured in position by driving the eyelets 28 through the aligned holes 26 in the flanges 22 of the bottom wall panel $s$ and in the adjacent flanges 22 of the side wall forming panels $r$. Strips of solder 30 are applied to the inner corner seams by inserting the soldering iron through the open upper end of the packing case. The solder seams 30 seal together the metal liner sheets at the inner corners thereof and the molten solder will seep between the contacting metal surfaces of the paired flanged sections 22 to further secure the paired flanges 22 together in integral assembly. A packing case which is extremely strong and sturdy in construction and substantially air-tight is thus provided.

The packing case as thus assembled is telescoped over the supporting framework C when standing in the upright position as shown in Fig. 12. The packing case containing the supporting framework C with the rocket motors A and tail fins B, is then turned into upright position. If desired, a plywood end plate 15 may be positioned to rest on the upper end of the uprights 1 as shown in Figs. 1 and 8 before the packing case is telescoped over the framework, thereby providing additional protection to the adjacent ends of the rocket motors. A similar end plate 16 may be placed over the other end of the upright frame members 1 after the frame member has been placed therein, further protecting the adjacent lower ends of the rocket motors.

As the final assembly, a metal clad top wall panel $t$ is placed in position and the flanges 22 thereof secured by rivets or eyelets 28 to the adjacent flanges of the side wall forming panels $r$. A sealing plastic 40 may be applied to the adjacent metal faces of the flanges of the cover forming panel $t$ when the cover panel is seated, thereby hermetically sealing the paired flanges of the side and end wall panels together.

The packing case as above constructed will adequately support and protect rocket motors and tail fins weighing several hundred pounds under extreme conditions of rough handling. The packing case as thus constructed is hermetically sealed, preventing moisture, dampness or water from entering the case. It will be noted that the paired flanges 22 of the packing case form an unusually strong reinforcing framework for the case and give added protection to the face sections 21 of the panels. The outer corners of the flange sections 22 of the base sheet are preferably cut on a bevel, as shown more particularly in Figs. 10 and 13, so that the packing case may be more readily made to slide while resting on the flange sections without damage thereto. The packing case is so formed that the uprights 1 of the interior supporting framework snugly fit in the corners of the packing case, as shown more particularly in Fig. 13, thereby preventing separation of the uprights 1 from the supporting partitions 2 and 3 while the supporting framework is within the packing case. The outer corners of the uprights 1 are preferably slightly bevelled to fit around the corner solder seams as shown in Fig. 13. The supporting partitions 2 and 3 firmly retain the four rocket motors A in spaced relationship during shipment and handling, and the fin units B are firmly retained centrally positioned within the interior supporting framework by the grooves 11 formed in the frame members 1 and out of contact with the rocket motors. As thus supported and packed the rocket motors A and the tail fins B are rigidly held in spaced relationship, and when contained in the packing case constructed as above described are protected from damage and injury during shipment and handling. No blows or shocks can be transmitted to the delicate mechanisms which would cause damage thereto.

When the packing case and its contents reaches its destination, one of the side wall panels $r$ of the packing case may be removed. The supporting framework B can then be readily lifted out of the packing case by grasping the supporting partitions 2 and 3. When removed from the packing case the frame members 1 can then be readily lifted away from the supporting partitions 2 and 3, and the supporting partitions 2 and 3 withdrawn over the ends of the rocket motors A. Thus the rocket motors A and associated tail fins B may be made quickly accessible with assurance that these mechanisms will not be damaged during removal.

It will now be appreciated that the supporting framework C can be economically and rapidly made from inexpensive pieces of wood and plywood which can be quickly assembled to enclose elongated articles and complementary parts without nailing or pounding. The supporting framework can be easily disassociated and removed from the articles supported therein, thus expediting access to the packaged articles and removing any danger of injury thereto during unpacking. The packing case D which contains the supporting framework and packed articles may be made airtight to prevent any moisture or water from entering the case or contacting delicate parts contained therein. The case itself is multi-reinforced at the corners and at the edges thereof where strains and the danger of damage is greatest. The shipping assembly as above constructed provides an economical packaging medium for delicate mechanisms which are of substantial weight and which must undergo extreme conditions of rough handling and moisture before the container reaches its destination.

It is understood that various means of applying the principles of this invention may be employed, change being made in regard to details required by the particular application, and that changes and modifications in the form, construction and arrangement and combination of the several parts may be made and substituted for those herein shown and described without departing from the broad principles of this invention.

What is claimed is:

1. An article accessible shipping assembly, designed to contain and protect an article during shipment and handling including in combination, a knockdown supporting framework having a partition member adjacent each end thereof, each of said partition members having an opening therein through which one end of the article may be telescoped and removably supported by said partition members, means for removably joining each of said frame members to said partitions to removably retain said partition members in fixed spaced relationship to provide an article supporting framework unit but permitting lateral knockdown removal of said frame members from said partition members, comprising a notch adjacent each end of each of the frame members adapted to receive the adjacent edge of said partition members, and an enclosing case designed to removably contain and support said framework, comprising side wall panels and a bottom end wall panel, adapted to snugly receive said framework with the frame members thereof positioned at the inner corners of the case, and a removable cover end panel for said case.

2. A reusable, article accessible, shipping assembly for elongated articles including in combination, a knockdown supporting framework for the articles including spaced supporting partitions having spaced openings therein through which the ends of the articles may be telescoped and the articles removably supported in spaced relationship by said partition members, corner frame members extending substantially parallel to the longitudinal axis of the articles packaged and presenting smooth exterior faces, means for detachably connecting said frame members to said partitions including notches in said frame members adapted to receive the adjacent edges of said partition members, and an enclosing case designed to removably contain and support said framework, comprising side wall panels and a bottom wall panel, adapted to snugly receive said framework with the frame members thereof positioned at the inner corners of the case, and a removable cover end panel for said case.

3. An article accessible shipping assembly for elongated articles including in combination, a knockdown supporting framework for the articles including spaced polygonal shaped partitions for removably supporting the articles in suspension therebetween, said partitions having spaced openings therein through which the ends of the articles may be telescoped, corner frame members for removably retaining said partitions in predetermined spaced relationship to provide an article supporting framework unit, notches in said frame members adapted to receive the adjacent corners of said partitions permitting lateral knockdown removal of said corner frame members from said partitions, and an elongated shipping case of corresponding polygonal cross section designed to removably contain and support said framework, comprising side wall panels and a bottom end wall panel, adapted to snugly receive said framework with the frame members thereof positioned at the inner corners of the case, and a removable cover end panel for said case.

GLENN H. NORQUIST.

REFERENCES CITED

The following references are of record in the file of this patent:

FOREIGN PATENTS

| Number | Country | Date |
|---|---|---|
| 11,498 | Great Britain | Aug. 9, 1915 |
| 12,656 | Norway | Feb. 15, 1904 |
| 15,204 | Great Britain | Sept. 25, 1890 |